United States Patent
Yoshida

(10) Patent No.: US 7,590,827 B2
(45) Date of Patent: Sep. 15, 2009

(54) PROCESSOR AND INSTRUCTION CONTROL METHOD HAVING A STORAGE OF LATEST REGISTER FOR UPDATING DATA OF SOURCE OPERANDS, AND INSTRUCTION CONTROL

(75) Inventor: Toshio Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 240 days.

(21) Appl. No.: 10/347,407

(22) Filed: Jan. 21, 2003

(65) Prior Publication Data
US 2004/0006686 A1 Jan. 8, 2004

(30) Foreign Application Priority Data
Jul. 5, 2002 (JP) ............... 2002-197306

(51) Int. Cl.
*G06F 9/00* (2006.01)
(52) U.S. Cl. ...................... 712/217; 712/218
(58) Field of Classification Search ............... 712/217, 712/218
See application file for complete search history.

(56) References Cited

U.S. PATENT DOCUMENTS 5,627,985 A * 5/1997 Fetterman et al. .......... 712/217
5,946,468 A * 8/1999 Witt et al. ................... 712/218
5,961,634 A * 10/1999 Tran ........................... 712/218
6,047,369 A * 4/2000 Colwell et al. ............. 712/217

FOREIGN PATENT DOCUMENTS

| JP | 8-115215 | 5/1996 |
|----|----------|--------|
| JP | 9-6611 | 1/1997 |
| JP | 2000 181714 A | 6/2000 |

* cited by examiner

*Primary Examiner*—Niketa I Patel
*Assistant Examiner*—Benjamin P Geib
(74) *Attorney, Agent, or Firm*—Staas & Halsey LLP

(57) ABSTRACT

A latest register update buffer which stores latest register update data is allocated and prepared every general register for storing source data. A latest register update processing unit stores a value in the general register as latest register update data into the latest register update buffer when a register update instruction is not speculatively executed, and overwrites a result of the speculative execution when the instruction is speculatively executed. Upon instruction decoding, a matching processing unit reads out the latest register update data from the latest register update allocation buffer and stores it into a data area in a reservation station.

16 Claims, 15 Drawing Sheets

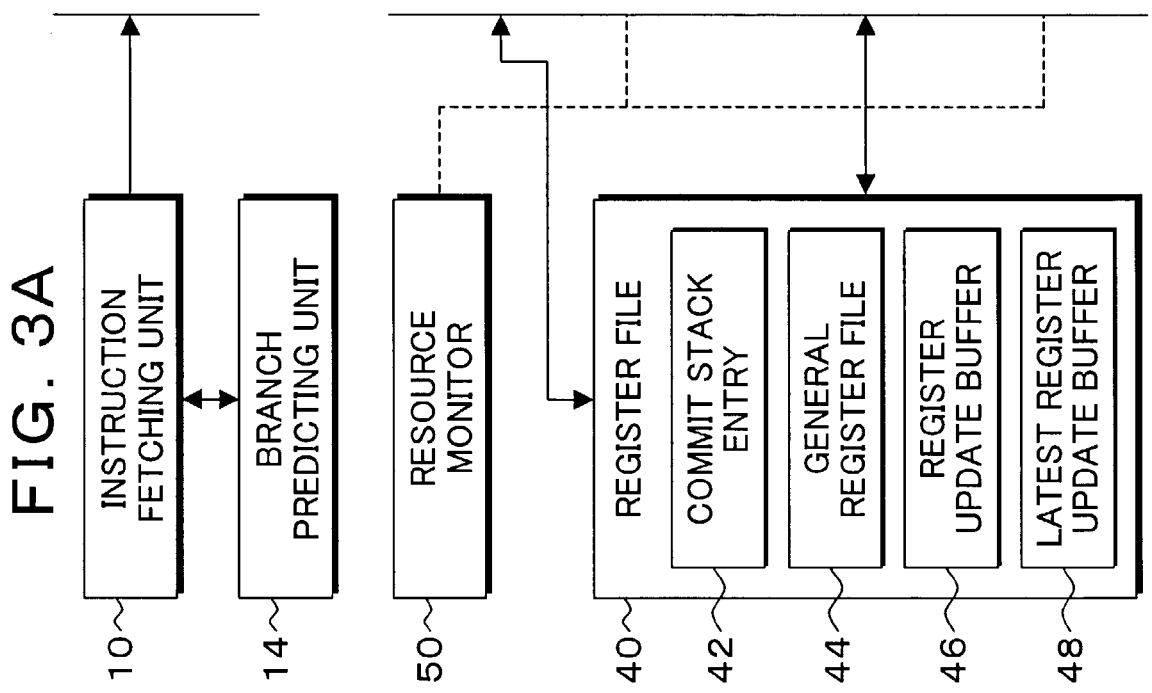

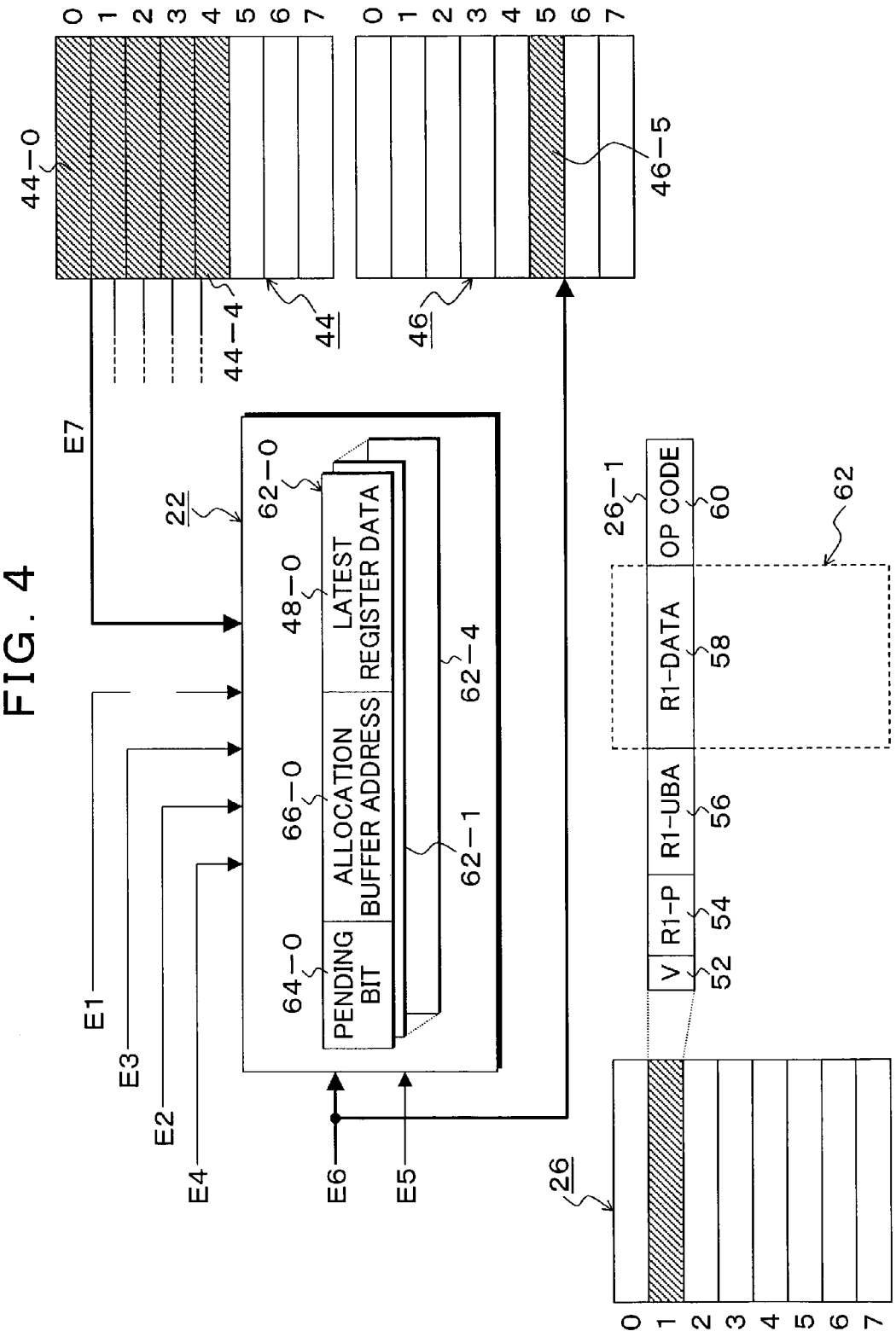

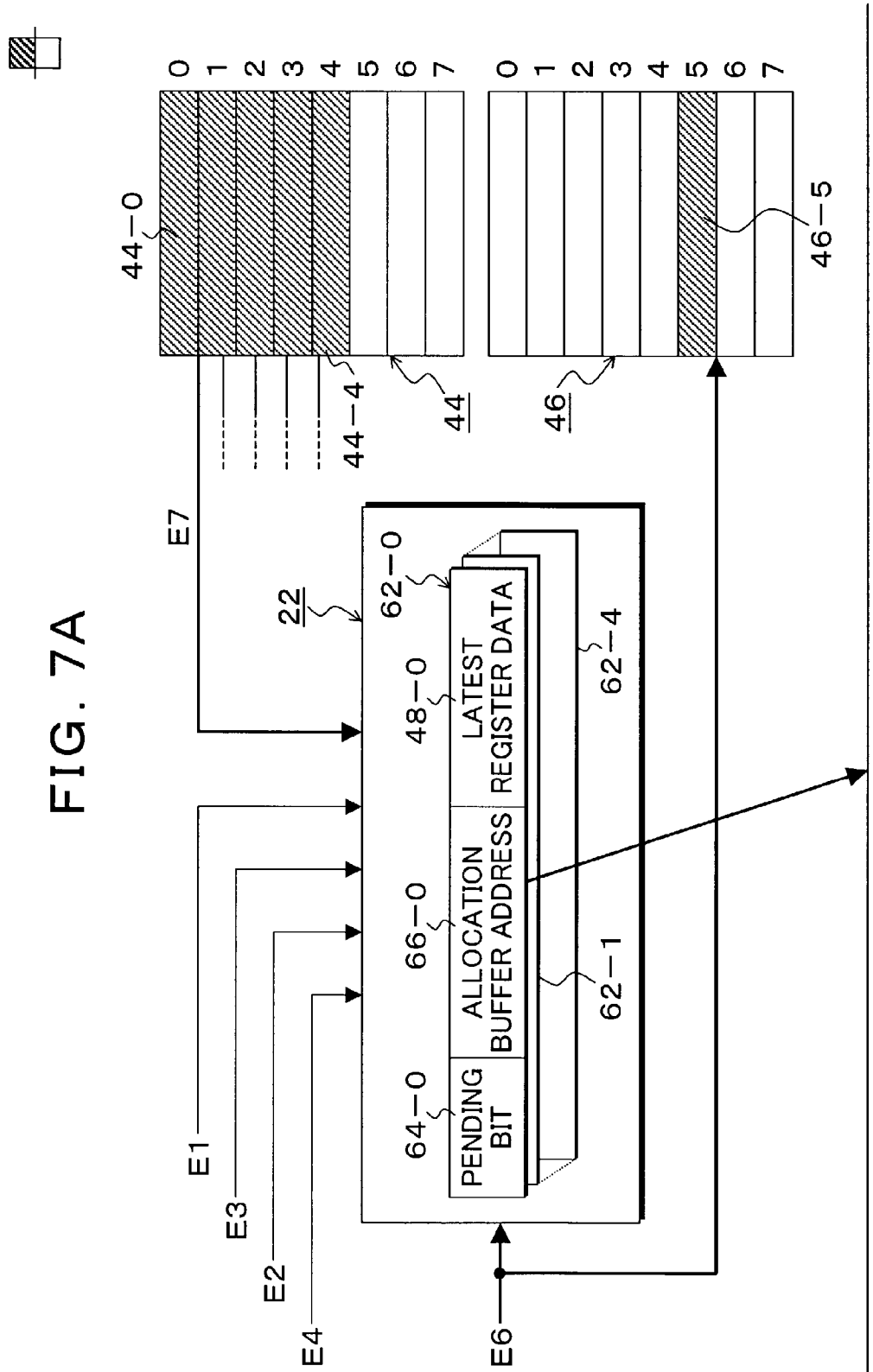

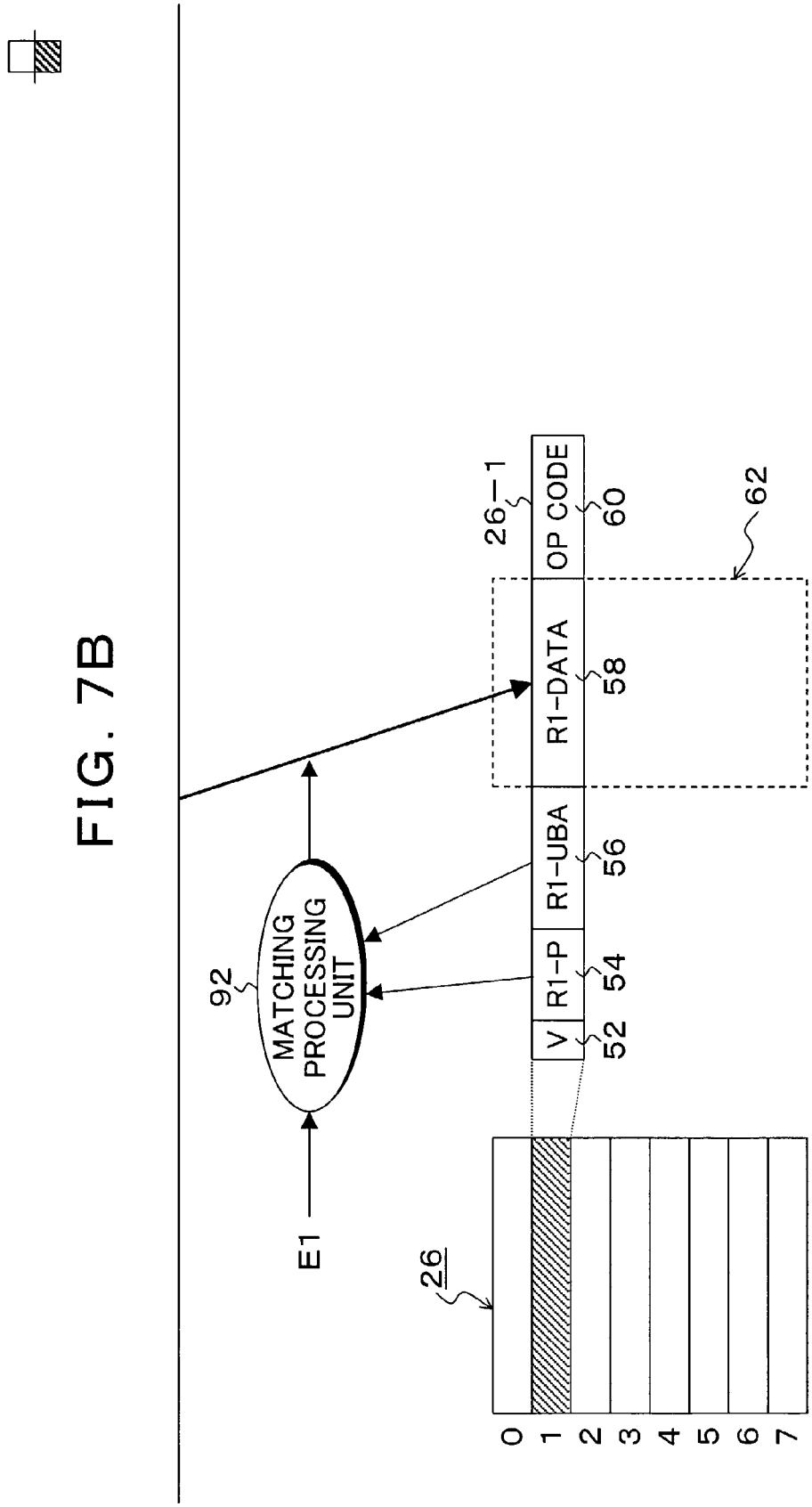

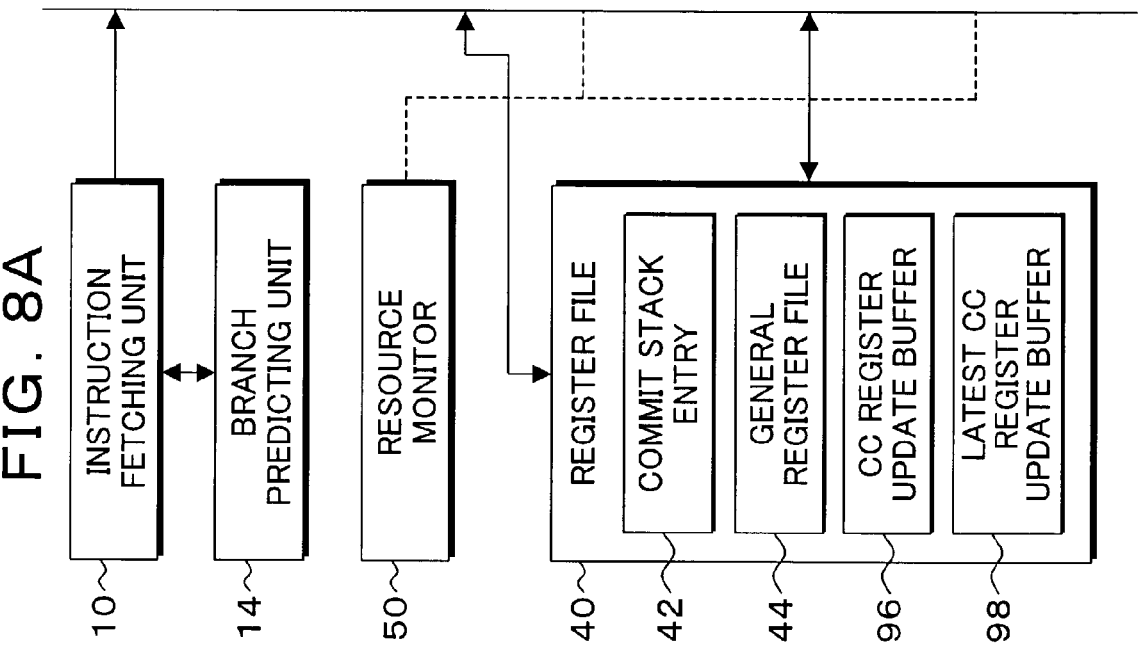

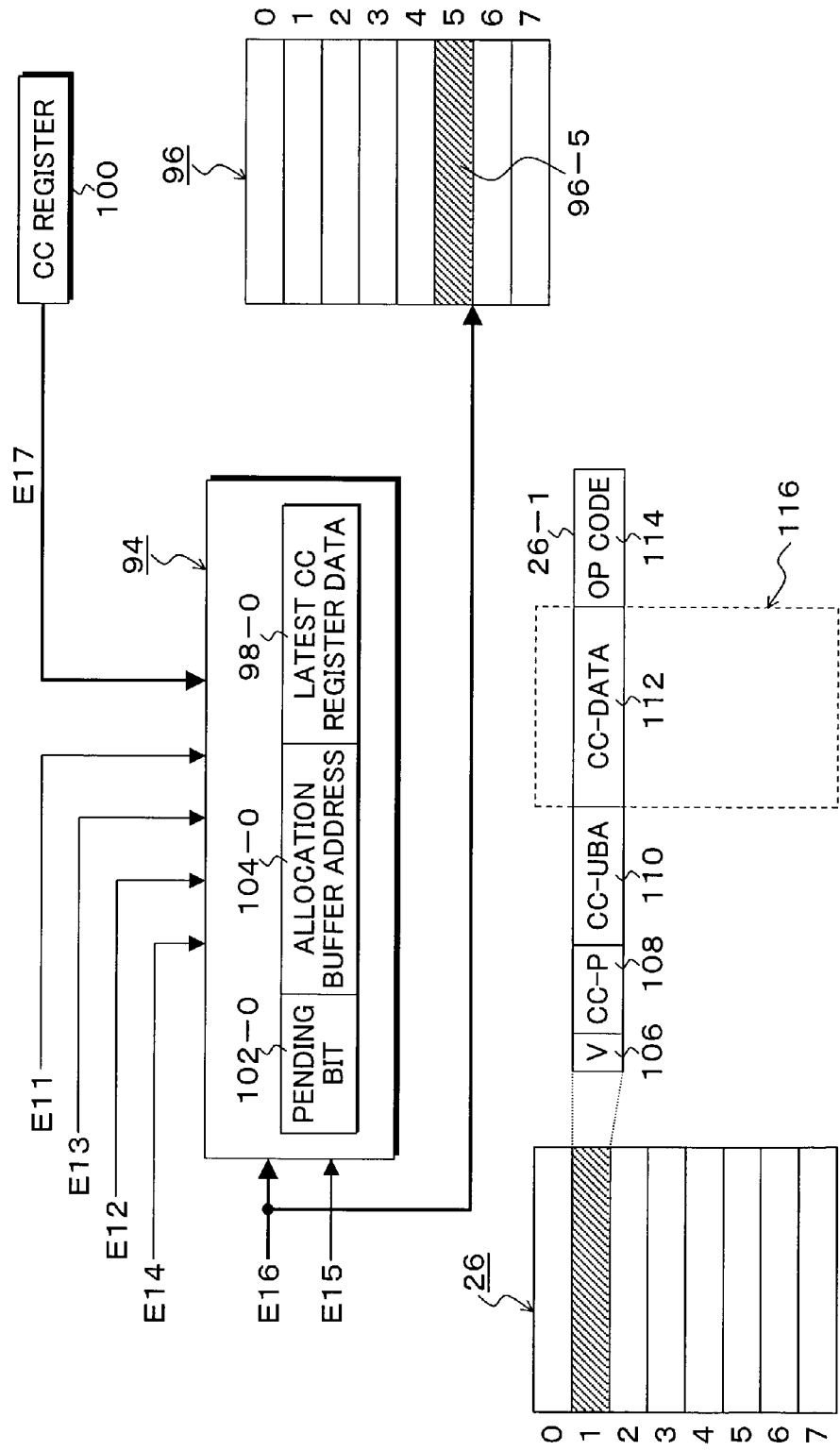

PROCESSOR AND INSTRUCTION CONTROL METHOD HAVING A STORAGE OF LATEST REGISTER FOR UPDATING DATA OF SOURCE OPERANDS, AND INSTRUCTION CONTROL

BACKGROUND OF THE INVENTION

1. Field of the Invention

The invention relates to a processor and an instruction control method for executing instructions by dynamic pipeline scheduling. More particularly, the invention relates to a processor and an instruction control method for storing register update data into a data area in a reservation station upon instruction decoding.

2. Description of the Related Arts

Hitherto, in a processor for executing dynamic pipeline scheduling, processes are executed separately by three units: an instruction issuing unit of in-order depending on program order; an instruction executing unit of out-of-order which does not depend on the program order; and a committing unit of the in-order depending on the program order. That is, the instruction issuing unit fetches instructions by the in-order, decodes them, and allows a reservation station to hold the instruction operation (OP code) and an operand. As soon as all operands are prepared in the reservation station and an arithmetic operating unit is made usable, the instruction executing unit speculatively executes the instruction by the out-of-order and obtains a result. The committing unit discriminates a commitment of the instruction on the basis of a branch prediction result or the like, completes the instruction by the in-order, and stores the execution result into a register file or a memory (only in the case of storage). In the processor using such dynamic pipeline scheduling, when a register update instruction is decoded by the instruction issuing unit, control for storing the register update data into a data area in an allocation entry of the reservation station is made, for example, as shown in FIG. 1.

In FIG. 1, for example, when the register update instruction fetched into an instruction word register 200-1 is decoded, if source data does not exist on a register update buffer 204, is not registered into a renaming map 205, and is not update-pending, a data signal 214 is read out from a corresponding general register 202-3 in a general register file 202 and stored into a data area 232 of a reservation station 206. That is, the data signal 214 is read out from the corresponding general register 202-3 in the general register file 202 by a register address signal 212. The data signal 214 is stored into the data area 232 in an allocation entry 206-1 in the reservation station 206 from a selector 216 which has been switched by an OFF state of a pending bit signal 220. A portion obtained by surrounding the data area 232 by a broken line every entry is generally called a data reservation station 234. When the register update instruction fetched in the instruction word register 200-1 is decoded, if the source data exists on the register update buffer 204 and is registered into the renaming map 205 and is update-pending, the data is read out from an allocation buffer 204-3 in the register update buffer 204 as a renaming register of the source data and stored into the data area 232 of the reservation station 206. That is, an allocation buffer address 210 is obtained with reference to the renaming map 205 by a register address signal 224 in the general register 202-3 in which the source data has been stored. Register update data 228 is read out with reference to the allocation buffer 204-3 in the register update buffer 204 by an allocation buffer address signal 226. The register update data 228 is stored into the data area 232 in the allocation entry 206-1 in the reservation station 206 from the selector 216 switched by the pending bit signal 220 which has been set to ON by a pending bit 208 showing that the data is update-pending at this time. With respect to such storage control of the register update data into the data area of the reservation station, that is, into the data reservation station, besides the data in the general register, in a processor using an SPARC instruction architecture, there is a CC register update instruction for updating a condition code (referred to as "CC" in the case of expressing it as an abbreviation in the following description) as source data. A code indicative of a state of a result of an execution of a numerical value arithmetic operating instruction such as negative, zero, overflow, or carry is used as such a condition code. Therefore, also in the case where the CC register update instruction is decoded, control for storing CC register update data into the data reservation station is made as shown in FIG. 2 in a manner similar to the case of the update instruction of the general register.

In FIG. 2, for example, when the CC register update instruction fetched into an instruction word register 300-1 is decoded, if CC source data does not exist on a CC register update buffer 304, is not registered into a CC renaming map 305, and is not update-pending, a CC data signal 314 is read out from a CC register 302 and stored into a CC data area 332 in a reservation station 306. That is, the CC data signal 314 is read out from the CC register 302 by a CC register address signal 312. The CC data signal 314 is stored into the CC data area 332 in a CC allocation entry 306-1 in the reservation station 306 from a selector 316 which has been switched by an OFF state of a CC pending bit signal 320. A portion obtained by surrounding the CC data area 332 by a broken line every entry is generally called a CC data reservation station 334. When the CC register update instruction fetched in the instruction word register 300-1 is decoded, if the CC source data exists on the CC register update buffer 304, is registered into the CC renaming map 305, and is update-pending, CC register update data 328 is read out from a CC allocation buffer 304-3 in the CC register update buffer 304 as a renaming register of the CC source data and stored into the CC data area 332 of the reservation station 306. That is, a CC allocation buffer address 310 is obtained with reference to the CC renaming map 305 by a CC register address signal 324 in the CC register 302 in which the CC source data has been stored. CC register update data 328 is read out with reference to the CC allocation buffer 304-3 in the CC register update buffer 304 by a CC allocation buffer address signal 326. The CC data 328 is stored into the CC data area 332 in the CC allocation entry 306-1 in the reservation station 306 from the selector 316 which has been switched by the CC pending bit signal 320 which has been set to ON by a CC pending bit 308 showing that the data is update-pending in this instance.

However, in the conventional control for storing the source data into the reservation station upon instruction decoding as shown in FIG. 1, if the source data is not update-pending, the processes of the following two stages are executed.

(1) Read-out from the general register 202-3 by the register address signal 212.

(2) Storage of the read-out data signal 214 into the reservation station 206.

If the source data is update-pending, the processes of the following three stages are executed.

(1) Reference to the renaming map 205 by the register address signal 224.

(2) Read-out from the allocation register 204-3 by the allocation buffer address signal 226.

(3) Storage of the read-out register update data 228 into the reservation station 206.

Since a logic of the data storage control into the reservation station becomes deep due to the discrimination result about whether the source data is update-pending or not as mentioned above, it becomes a large obstacle to improvement of an operating frequency of the processor. That is, a decoding cycle is determined by the control of three stages of the deep logic.

Such a problem is also true of respect to the control for storing the CC source data into the reservation station upon decoding of the instruction as shown in FIG. 2. In FIG. 2, if the CC source data is not update-pending, the processes of the following two stages are executed.

(1) Read-out from the CC register 302 by the CC register address signal 312.
(2) Storage of the read-out CC data signal 314 into the reservation station 306.

If the CC source data is update-pending, the processes of the following three stages are executed.

(1) Reference to the CC renaming map 305 by the CC register address signal 324.
(2) Read-out from the CC allocation buffer 304-3 of the CC register update buffer 304 by the CC allocation buffer address signal 326.
(3) Storage of the read-out CC data 328 into the reservation station 306.

Since a logic of the data storage control into the reservation station becomes deep due to the discrimination result about whether the CC source data is update-pending or not as mentioned above, it becomes a large obstacle to improvement of an operating frequency of the processor.

SUMMARY OF THE INVENTION

According to the invention, there are provided a processor and an instruction control method for enabling data to be stored into a reservation station at a high operating frequency by simplifying a logic irrespective of a discrimination result about whether source data or CC source data is update-pending or not upon decoding of a register update instruction.

Storage of Register Update Data

According to the invention, there is provided a processor comprising: a latest register update allocation buffer which is allocated every general register for storing source data and stores latest register update data; a buffer control unit which stores the latest register update data into the latest register update allocation buffer in accordance with the presence or absence of speculative execution of a register update instruction; and a matching processing unit serving as a storage control unit which reads out the latest register update data from the latest register update allocation buffer and stores it into a data area in a reservation station upon instruction decoding. As mentioned above, according to the invention, the latest register update buffer is allocated and prepared for every general register, while the register update instruction is not speculatively executed, the data in the general register is stored into the latest register update allocation buffer, when the register update instruction is speculatively executed, the data is overwritten into the latest register update buffer by a result of the speculative execution, and when the register update instruction is decoded, all data is read out from the latest register update buffer and stored into the data area in the reservation station regardless of whether the register update data is update-pending or not, thereby simplifying a selection logic and enabling an operating frequency of the processor to be raised.

The buffer control unit stores the latest register update data obtained by the speculative execution of the instruction into the latest register update buffer. The buffer control unit comprises: an address latch which holds an allocation address of the register update allocation buffer; an update pending latch which holds a pending bit showing that the register update data is update-pending; and a logic control unit which stores the latest register update data into the latest register update buffer in an updating cycle by the speculative execution of the instruction under conditions such that an update address of the register update data coincides with the allocation address in the address latch, the pending bit is held in the update pending latch (pending bit latch), and an updating cycle valid signal is obtained.

The buffer control unit stores the data in the general register into the latest register update buffer when the instruction which is being speculatively executed is abandoned (upon flushing). A latest register update data processing unit known as a buffer control unit reads out the data from the general register and stores it into the latest register update allocation buffer in one blank cycle after the instruction which is being speculatively executed is abandoned. The buffer control unit reads out the latest register update data with reference to the latest register update allocation buffer by a register address and stores it into the data area in the reservation station upon instruction decoding.

According to the invention, an instruction control method of a processor which executes instructions by dynamic pipeline scheduling is provided. This instruction control method comprises:

a buffer control step wherein latest register update data is stored into a latest register update allocation buffer which is allocated every general register for storing source data in accordance with the presence or absence of speculative execution of a register update instruction; and a storage control step wherein the latest register update data is read out from the latest register update allocation buffer and stored into a data area in a reservation station upon instruction decoding. Details of the instruction control method are fundamentally the same as those in the case of the processor.

Storage of CC Register Update Data

According to the invention, there is provided a processor comprising: a latest CC register update allocation buffer which is allocated every register for storing a condition code CC and stores latest CC register update data; a buffer control unit which sets the latest CC register update data into the latest CC register update allocation buffer in accordance with the presence or absence of speculative execution of a CC register update instruction; and a storage control unit which reads out the latest CC register update data from the latest CC register update allocation buffer and stores it into a CC data area in a reservation station upon instruction decoding. As mentioned above, according to the invention, the latest CC register update buffer is allocated and prepared for every CC register, while the CC register update instruction is not speculatively executed, the data in the CC register is stored into the latest CC register update allocation buffer, when the CC register update instruction is speculatively executed, the data is overwritten into the latest CC register update allocation buffer by the result of the speculative execution, and when the CC register update instruction is decoded, all data is read out from the latest CC register update allocation buffer and stored into the CC data area in the reservation station regardless of whether the CC register update data is update-pending or not, thereby simplifying a selection logic and enabling an operating frequency of the processor to be raised.

The buffer control unit stores the latest CC register update data obtained by the speculative execution of the instruction into the latest CC register update allocation buffer. The buffer control unit comprises: an address latch which holds an allocation address of the CC register update allocation buffer; an update pending latch which holds a pending bit showing that the CC register update data is update-pending; and a logic control unit which stores the latest CC register update data into the latest CC register update allocation buffer in an updating cycle by the speculative execution of the instruction under conditions such that an update address of the CC register update data coincides with the allocation address in the address latch, the pending bit is held in the update pending latch, and an updating cycle valid signal is obtained. The buffer control unit stores the data in the CC register into the latest CC register update allocation buffer when the instruction which is being speculatively executed is abandoned. The buffer control unit reads out the data from the CC register and stores it into the latest CC register update allocation buffer in one blank cycle after the instruction which is being speculatively executed is abandoned. The buffer control unit reads out the latest CC register update data with reference to the latest CC register update allocation buffer by the address in the CC register and stores it into the CC data area in the reservation station upon instruction decoding.

According to the invention, an instruction control method of a processor which executes instructions by dynamic pipeline scheduling is provided. This instruction control method comprises:

a buffer control step wherein latest CC register update data is set into a latest CC register update allocation buffer which is allocated every register for storing a condition code CC in accordance with the presence or absence of speculative execution of a CC register update instruction; and a storage control step wherein the latest CC register update data is read out from the latest CC register update allocation buffer and stored into a CC data area in a reservation station upon instruction decoding.

Details of the instruction control method are fundamentally the same as those of the processor.

The above and other objects, features, and advantages of the present invention will become more apparent from the following detailed description with reference to the drawings.

BRIEF DESCRIPTION OF THE DRAWINGS

FIGS. 3A and 3B are block diagrams of a hardware construction of a processor according to the invention for making storage control of register data into a reservation station;

FIG. 4 is a functional block diagram of instruction control according to the invention for storing data into a latest register update buffer at an update stage;

FIGS. 7A and 7B are functional block diagrams of instruction control according to the invention for storing the data in the latest register update buffer in FIG. 4 into a reservation station at a decode stage;

FIGS. 8A and 8B are block diagrams of the hardware construction of the processor according to the invention for making storage control of CC register data into the reservation station;

FIG. 9 is a functional block diagram of instruction control according to the invention for storing CC data into the latest register update buffer at the update stage;

DETAILED DESCRIPTION OF THE PREFERRED EMBODIMENT

Figure 1:
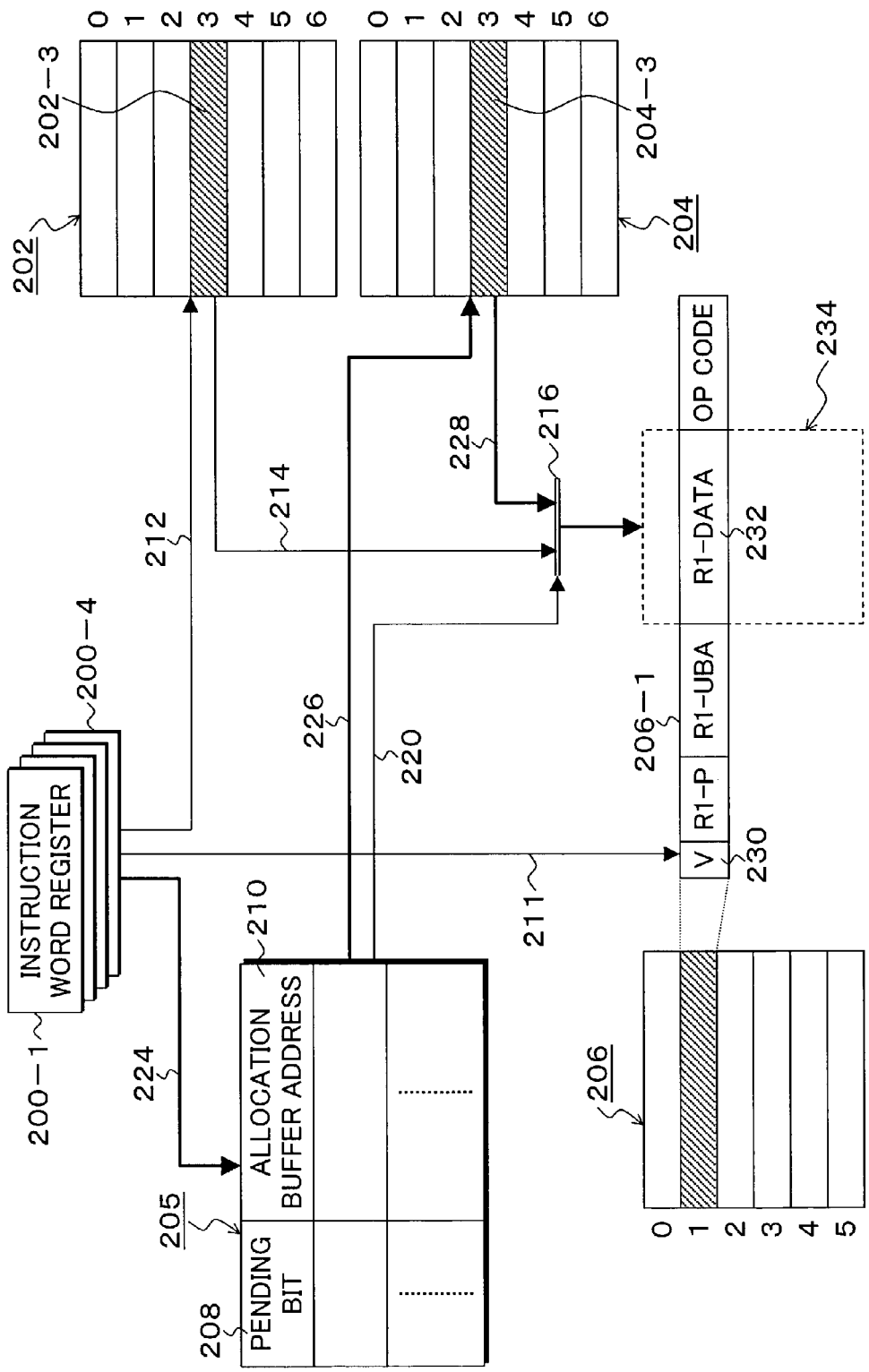
FIG. 1 is an explanatory diagram of conventional instruction control for storing register update data into a reservation station.
Figure 2:
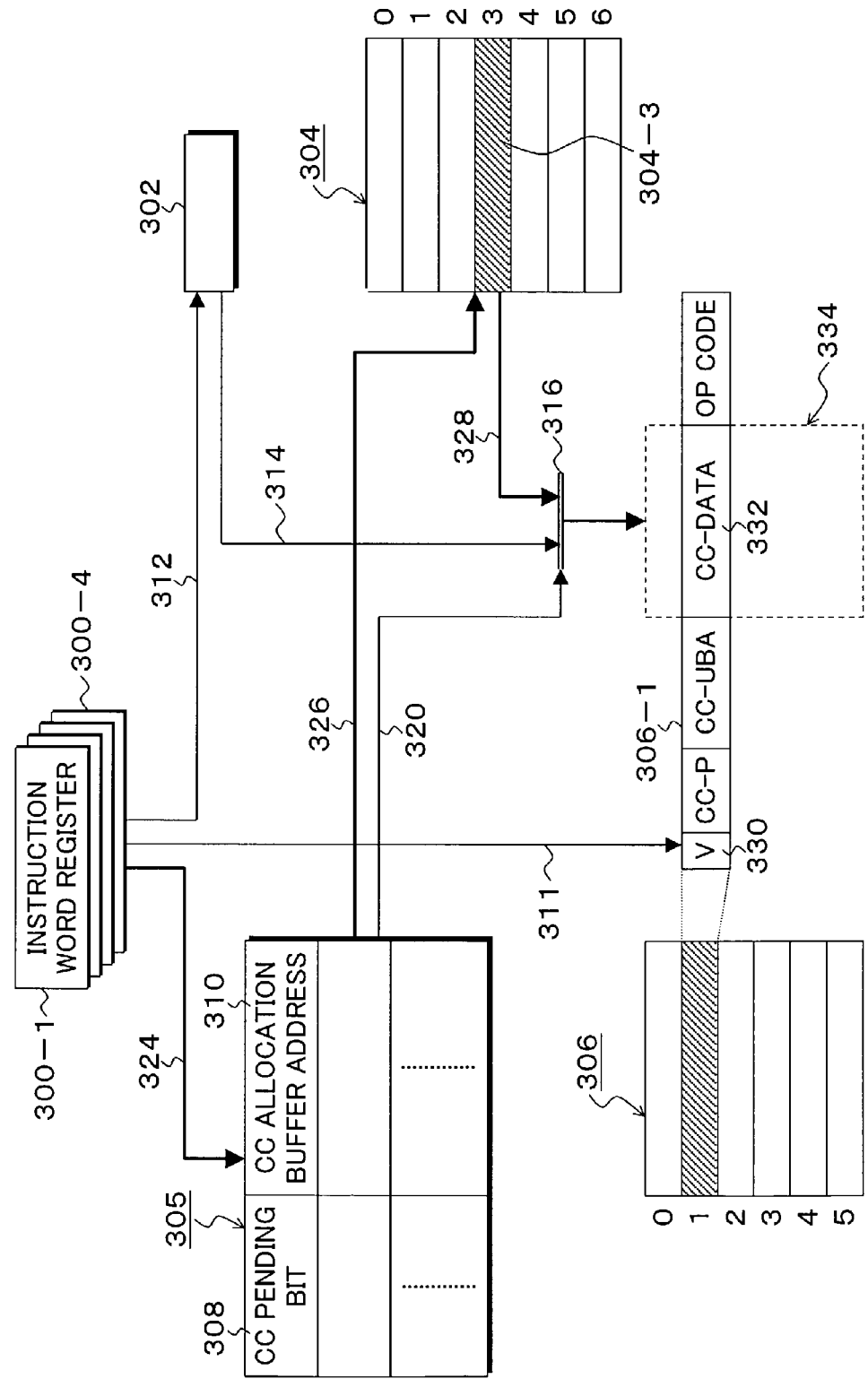
FIG. 2 is an explanatory diagram of conventional instruction control for storing CC register update data into the reservation station.
Figure 3B:
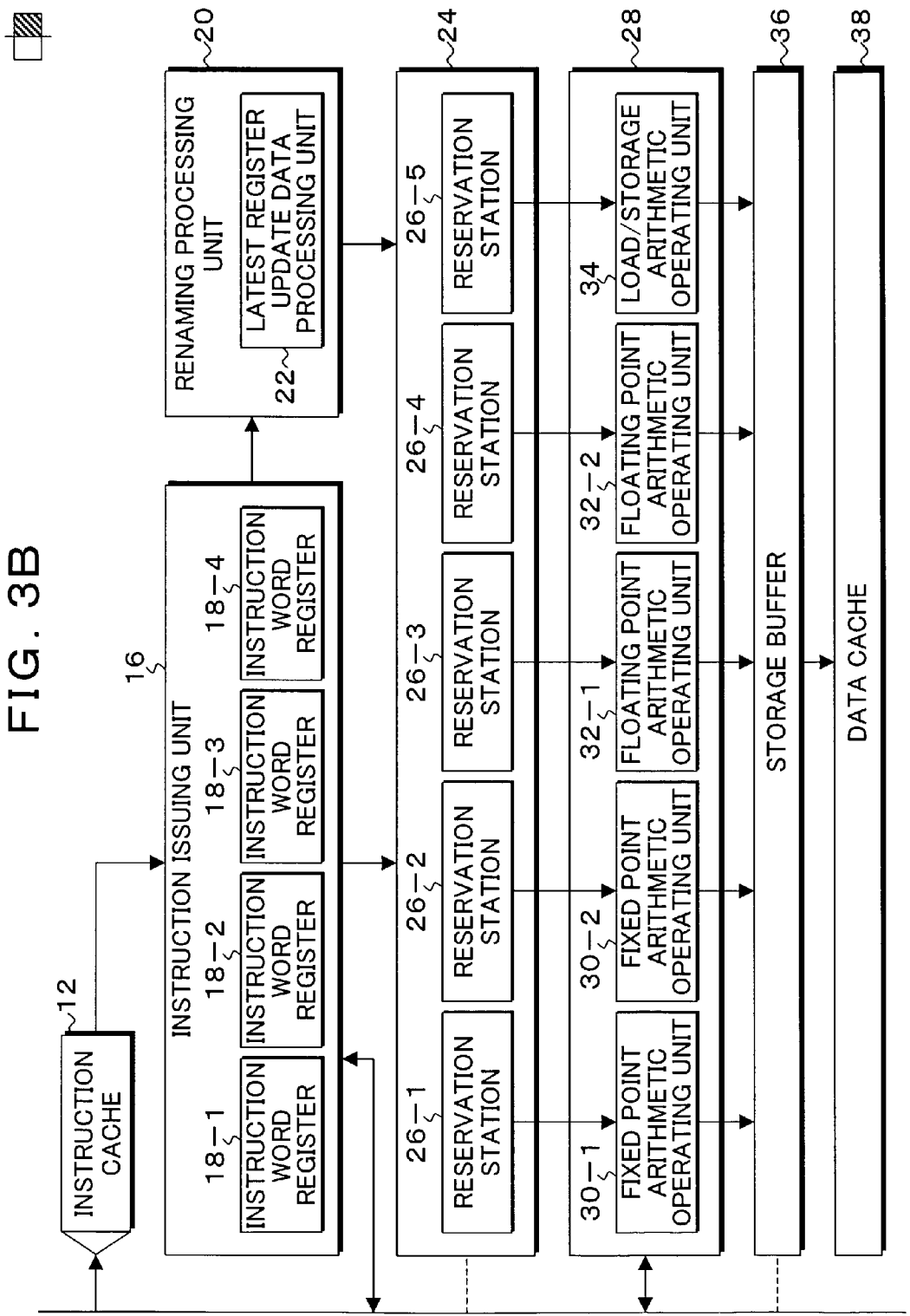

FIGS. 3A and 3B are block diagrams of a hardware construction of a processor for making instruction issue control according to the invention. The processor of the invention executes instructions by dynamic pipeline scheduling and stores latest register update data into a reservation station in accordance with speculative execution of a register update instruction.

In FIGS. 3A and 3B, the processor comprises: an instruction fetching unit 10; an instruction cache 12; a branch predicting unit 14; a reservation station processing unit 24; an instruction executing unit 28; a storage buffer 36; a data cache 38; a register file 40; and a resource monitor 50. Four instruction word registers 18-1 to 18-4 are provided for an instruction issuing unit 16. Four instructions including the register update instruction as a target of the invention are simultaneously fetched and decoded. Reservation stations 26-1 to 26-5 are provided for the reservation station processing unit 24. Fixed point arithmetic operating units 30-1 and 30-2, floating point arithmetic operating units 32-1 and 32-2, and a load/storage arithmetic operating unit 34 are provided for the instruction executing unit 28. The register file 40 has: a commit stack entry 42; a general register file 44 known as an architecture register file; a register update buffer 46 serving as a target of register allocation of a renaming processing unit 20; and further, a latest register update buffer 48 which is used to hold latest register update data of the invention. A latest register update data processing unit (buffer control unit) 22 for making data storage control into the reservation station according to the invention is provided for the renaming processing unit 20. In accordance with the presence or absence of the speculative execution of the register update instruction, the latest register update data processing unit 22 stores the latest register update data into an allocation buffer in the latest register update buffer 48, reads out the latest register update data from the allocation buffer in the latest register update buffer 48, and stores it into a data area in the reservation station 26 (26-1~26-5) upon decoding of the register update instruction. The instruction cache 12 and the data cache 38 are connected to a memory via a system controller from an interface (not shown) corresponding to the SPARC port architecture.

In FIGS. 3A and 3B, a fundamental processing procedure of the processor of the invention for executing the dynamic pipeline scheduling will be described hereinbelow. The instruction fetching unit 10 collectively fetches, for example, four instructions from a queue on the instruction cache 12 side into the four instruction word registers 18-1 to 18-4 in the instruction issuing unit 16 and decodes them. The four decoded instructions are sent to the reservation station processing unit 24. The reservation station processing unit 24 has, for example, the five reservation stations 26-1 to 26-5 which are used for arithmetic operations and stores the instructions into the reservation stations with empty spaces having a predetermined relation. Each of the reservation stations 26-1 to 26-5 has, for example, eight entries, so that a total of 40 instructions can be reserved. The issue of the instructions to the reservation station processing unit 24 is executed by in-order according to order of the program. Simultaneously with that the instructions are inputted to the reservation stations 26-1 to 26-5, an entry is also allocated into the commit stack entry 42 every instruction and held until release by a commitment of the instruction. In the embodiment, the commit stack entry 42 has 64 entries. Therefore, no instruction is issued from the instruction word registers 18-1 to 18-4 in the instruction issuing unit 16 if the entry which can be used does not exist in resources such as corresponding reservation stations 26-1 to 26-5 in the reservation station processing unit 24, the commit stack entry 42, and the like, but they are stalled in a decoding cycle. When all operands of the instructions are prepared in one of the reservation stations 26-1 to 26-5 and the corresponding arithmetic operating unit enters a state where an arithmetic operation can be performed, the instruction executing unit 28 immediately executes the instruction operation and an execution result is obtained. The operations for executing the instructions in the instruction executing unit 28 are not performed in order of the program but are successively and speculatively executed by the out-of-order from the executable instruction. By receiving a discrimination result indicative of establishment of a branch or the like, the instruction is committed and the execution result of the instruction executing unit 28 is stored into the storage buffer 36. After that, if the instruction is a storing instruction, it is stored into the data cache 38 and the instruction is completed by the in-order. If the instruction is another arithmetic operating instruction, it is further stored into the corresponding register in the general register file 44 and the instruction is completed by the in-order. When the instruction is committed as mentioned above, the allocation entry in the commit stack entry 42 is released.

The processor of the invention executes the instruction operation by the out-of-order in the instruction executing unit 28 and the instructions are not executed in order of the program, therefore, a dedicated register to hold information has to be allocated every instruction. Since, for example, the four instruction word registers 18-1 to 18-4 are prepared for the instruction issuing unit 16, if four dedicated registers cannot be allocated, the instructions cannot be simultaneously stored into the reservation station processing unit 24 but have to be stalled in the decoding cycle at a point when the dedicated registers have fully been allocated. The register update buffer 46 is prepared as a dedicated register which is allocated every instruction. In the embodiment, the register update buffer 46 has, for example, 64 entries.

A register renaming is known as a method whereby the dedicated register is allocated every instruction and contents in the register are updated in order of the program and referred to. The register renaming will be specifically explained hereinbelow. It is now assumed that the following instructions 1, 2, and 3 exist.

$R1+R2=R3$      Instruction 1

$R3+R4=R3$      Instruction 2

$R3+R8=R9$      Instruction 3

Among those three instructions 1 to 3, there is a dependent relation between a destination register R3 of the instruction 1 and a first operand register R3 of the instruction 2. There is also a dependent relation between a destination register R3 of the instruction 2 and a first operand register R3 of the instruction 3. In such a case, in the register renaming, for example, the dedicated register is allocated as a renaming register R3$a$ to the destination register R3 of the instruction 1 and the first operand register R3 of the instruction 2. A renaming register R3$b$ is allocated to the destination register R3 of the instruction 2 and the first operand register R3 of the instruction 3. Use of the renaming register R3$a$ allocated upon decoding of the instruction is assured until the instruction 1 is committed. Use of the renaming register R3$b$ is assured until the instruction 2 is committed.

FIG. 4 is a block diagram of a functional construction of the latest register update data processing unit 22 in FIG. 3 and shows a processing state where the latest register update data which is stored into the reservation station is prepared onto the allocation register on the latest register update buffer. The instruction serving as a target in the invention here stores a value in a source register into a data area 58 of the reservation station 26 by the decoding cycle of the instruction. As for the value in the source register, if the register update instruction is not speculatively executed, that is, if the data is not update-pending due to the allocation of the register update buffer, the value of the general register is stored into the data area 58 of the reservation station 26 by the decoding cycle of the instruction. On the other hand, if the register update instruction is speculatively executed, that is, if the data is update-pending due to the allocation of the register update buffer 46, a result of the speculative execution is stored into the data area 58 of the reservation station 26 by the updating cycle subsequent to the executing cycle.

If five general registers 44-0 to 44-4 are used as source registers in the general register file 44, buffer allocation entries 62-0 to 62-4 are prepared for the latest register update data processing unit 22 in correspondence to the general registers 44-0 to 44-4, respectively. As for the buffer allocation entries 62-0 to 62-4, as shown in the buffer allocation entry 62-0, a latest register update allocation buffer 48-0 allocated on the latest register update buffer 48 in FIGS. 3A and 3B is prepared and, in addition to it, a pending bit latch 64-0 and an allocation buffer address latch 66-0 are provided. This point is also similar to the other buffer allocation entries 62-1 to 62-4. In order to write latest register update data according to the presence or absence of the speculative execution of the register update instruction, a decode stage allocation buffer address signal E1 which is obtained at the decode stage of the instruction and an update pending signal E2 are supplied to the latest register update data processing unit 22. In order to overwrite the register value of an arithmetic operation result obtained by the speculative executing stage after the decode stage as latest register update data, an update stage allocation buffer address signal E3 which is obtained at the update stage subsequent to the executing stage, an updating cycle valid signal E4, and an arithmetic operation result data signal E6 are also supplied. Further, a 1 cycle-late signal E5 of a flush to return the instruction to a state before a branch when the instruction which was speculatively executed is abandoned is supplied to the latest register update data processing unit 22. Considering the latest register update allocation buffer 48-0 of the latest register update data processing unit 22 as an example, when the instruction is not speculatively executed, a register value by a general register data signal E7 read out from the general register 44-0 is stored.

On the other hand, if the register value of the result of the speculative execution of the instruction is obtained, the register value in the general register 44-0 stored in the latest register update allocation buffer 48-0 is overwritten by the register value of the result of the arithmetic operation at timing of the update stage subsequent to the executing stage. The latest register update data stored in the latest register update allocation buffer 48-0 is read out at the decode stage of the instruction which uses the register value as a source operand and and stored into, for example, the data area 58 of the reservation station allocation entry 26-11 in the reservation station 26. When considering the reservation station allocation entry (hereinafter, referred to as an "RS allocation entry") 26-1 as an example, each entry in the reservation station 26 includes: a valid bit 52; an R1 pending bit 54; an R1 update buffer address 56; the data area 58; and an instruction operation 60 in which an OP code or the like has been stored. Although a first operand serving as a first source register R1 side is shown as an example in the RS allocation entry 26-11 shown in the diagram, subsequently to it, usually, the RS allocation entry 26-11 has a second operand serving as a second source register R2 side and, further, has an area of a destination register address subsequent to the instruction operation 60. However, they are not shown.

Figure 5:
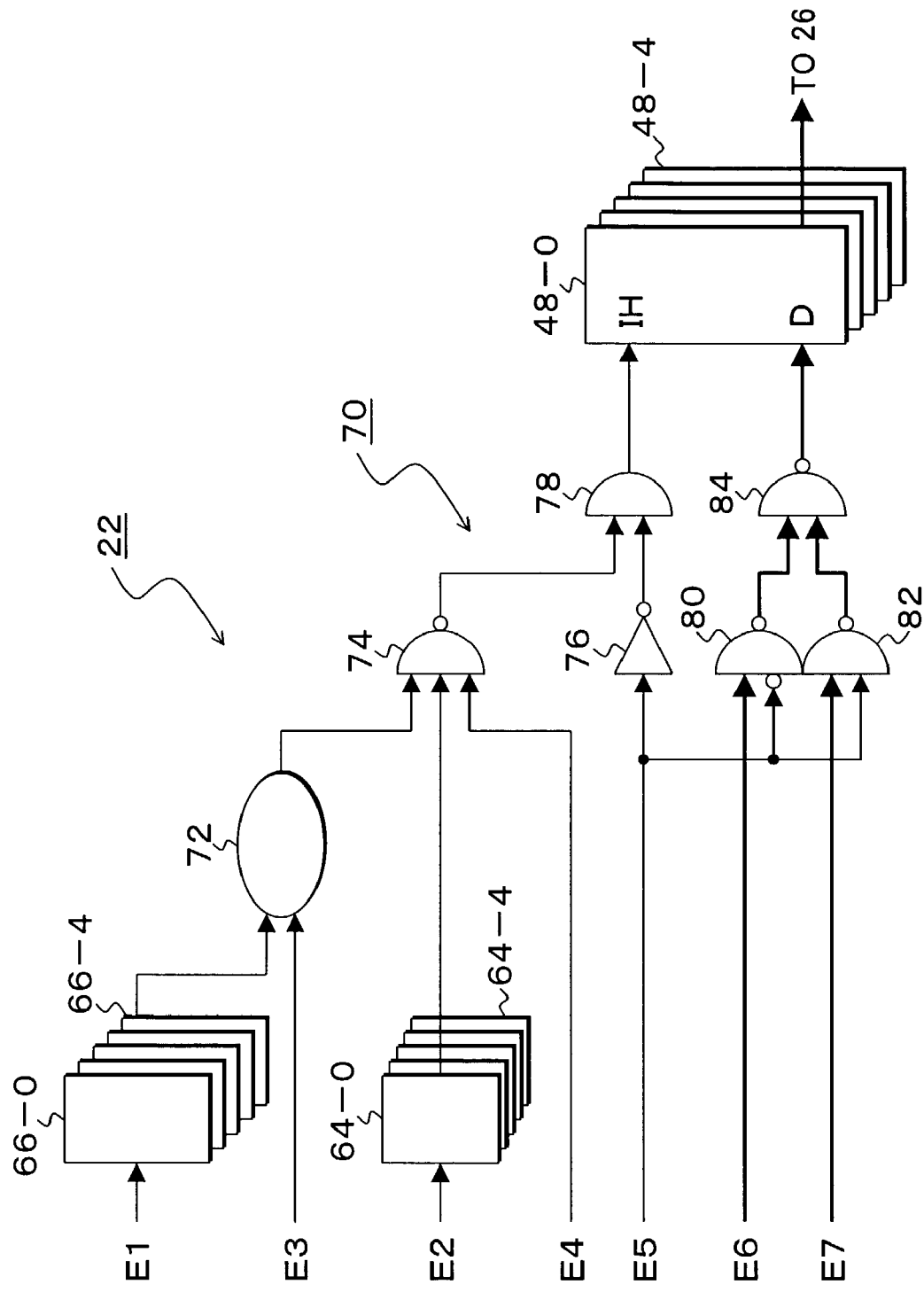
FIG. 5 is a block diagram of a functional construction in a latest register update data processing unit in FIG. 4.

FIG. 5 is a functional block diagram showing a specific embodiment of the latest register update data processing unit 22 in FIG. 4. Latest register update allocation buffers 48-0 to 48-4 are provided in correspondence to the general registers. In addition to them, pending bit latches 64-0 to 64-4 and allocation buffer address latches 66-0 to 66-4 are provided in correspondence to the general registers. Further, a logic control unit 70 for storing the register values in the general registers or the register values as results of the speculative execution is provided for the latest register update allocation buffers 48-0 to 48-4. The logic control unit 70 is constructed by a matching processing unit 72, NAND gates 74, 80, 82, and 84, an inverter 76, and an AND gate 78.

Subsequently, the processing operation of the latest register update data processing unit 22 in FIG. 5 will be explained. If it is determined that the register update is executed at the decode stage of the instruction, the decode stage allocation buffer address signal E1 of the latest register update allocation buffer 48-0 for storing the register value of the execution result by the speculative execution until the commitment of the instruction is held in the allocation buffer address latch 66-0. Since the update pending signal E2 showing that the latest register update allocation buffer 48-0 is update-pending is obtained at the decode stage of the instruction, it is held in the pending bit latch 64-0. Subsequently, the register value of the execution result by the speculative execution of the instruction is obtained. At the next update stage, the update stage allocation buffer address signal E3 and the updating cycle valid signal E4 are obtained. The update stage allocation buffer address signal E3 is supplied to the matching processing unit 72 and compared with the allocation buffer address obtained at a recording stage held in the allocation buffer address latch 66-0. If they coincide, an output to the NAND gate 74 is set to the logic level 1. In the following explanation, the logic level is simply referred to as a level. At this time, since the pending bit has already been held in the pending bit latch 64-0 at the decode stage, the output to the NAND gate 74 is at the logic level 1. Further, an input to the NAND gate 74 is also set to the logic level 1 by the updating cycle valid signal E4. Therefore, the output of the NAND gate 74 is set to the logic level 0. Since the 1 cycle-late signal E5 of the flush is not obtained in this instance, an output of the inverter 76 is at the level 1, so that an output of the AND gate 78 is set to the level 0, thereby validating write control to a control terminal IH (Inhibit Pin) of the latest register update allocation buffer 48-0. Therefore, the arithmetic operation result data signal E6 showing the register value obtained as a result of the speculative execution is written from a data terminal D of the latest register update allocation buffer 48-0 via the NAND gates 80 and 84. If the instruction which was speculatively executed is abandoned due to a misbranch (that is, a failure of the branch), the 1 cycle-late signal E5 of the flush to abandon all of the instructions executed from the branch prediction is obtained. The general register data signal E7 indicative of the register value in the general register at that time is stored into the latest register update allocation buffer 48-0. That is, if the 1 cycle-late signal E5 of the flush is obtained, the output of the inverter 76 is set to the level 0, so that the output of the AND gate 78 is also set to the level 0, thereby validating the writing at the control terminal IH of the latest register update allocation buffer 48-0. At this time, the NAND gate 82 enters a permission state by the 1 cycle-late signal E5 of the flush, so that the general register data signal E7 is sent to the data terminal D of the latest register update allocation buffer 48-0 via the NAND gates 82 and 84 and overwritten by the register value in the general register.

Figure 6:
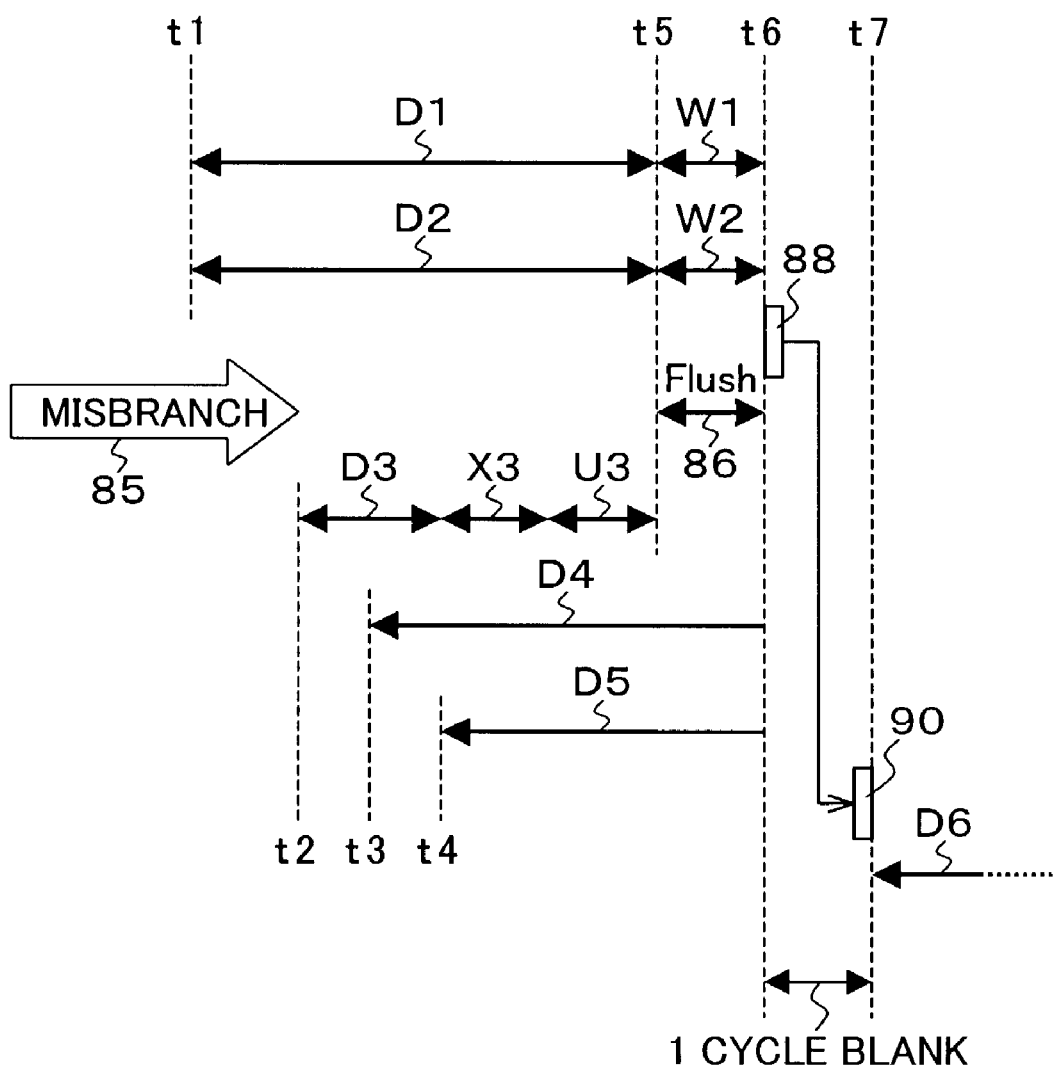
FIG. 6 is an explanatory diagram of a pipeline stage at which a data storing process of the invention is executed.

FIG. 6 is an explanatory diagram of a pipeline stage corresponding to the processing operation of the latest register update data processing unit 22 in FIG. 5. Decode stages D1 and D2 of two instructions are started at time t1. Decode stages D3, D4, and D5 of instructions based on the branch prediction are sequentially executed at times t2, t3, and t4. At the decode stage D3 of the instruction in the speculative execution at time t2, a latch of an allocation buffer address of the latest register update allocation buffer 48-0 to the allocation buffer address latch 66-0 in FIG. 5 and a latch to the pending bit latch 64-0 by the update pending signal E2 are executed. Subsequently, an arithmetic operation of the instruction is executed at an executing stage X3 after the decode stage D3 and the register value as an arithmetic operation result is obtained. As for the register value as an arithmetic operation result by the speculative execution, on the basis of the update stage allocation buffer address signal E3 and the updating cycle valid signal E4 in FIG. 5 which are obtained at a next update stage U3, the latest register update allocation buffer 48-0 is set into a write control state and the arithmetic operation result data signal E6 as a register value of the arithmetic operation result obtained at this time is stored into the latest register update allocation buffer 48-0. Subsequently, assuming that a misbranch 85 is decided at time t5 with respect to the speculative execution of the instruction based on the branch prediction, a flushing process 86 to abandon all of the instructions after the position of the misbranch 85 is started at time t5. Subsequent to the flushing process 86 during a time interval from time t5 to time t6, one cycle blank is provided and a decode stage D6 of the first instruction after the misbranch is started from time t7. In the invention, in the one cycle blank between time t6 and time t7, by the 1 cycle-late signal E5 of the flush to the latest register update data processing unit 22 in FIG. 5, the register value written in the general register at a writing stage W2 subsequent to the decode stage D2 of the second instruction from time t1 before the branch is read out by a general register reading process 88 and a latest register update buffer storing process 90 for overwriting the read-out register value to the register value at the update stage U3 held in the latest register update allocation buffer 48-0 in FIG. 5 is executed. Therefore, in the decode stage D6 of the first instruction from time t7 after the misbranch, the register value in the latest register update allocation buffer 48-0 is the general register value of the execution result which is not the speculative execution before the branch. At the decode stage D6, the general register value before the branch is read out and stored into the data storage area in the reservation station. The process is returned to timing before the branch and the instruction operation can be executed.

FIGS. 7A and 7B show processes for storing the register value of the buffer allocation entry 62-0 into the reservation station 26 at the decode stage of the instruction with respect to the latest register update data processing unit 22 in FIG. 4. The storage of the latest register update data value into the reservation station 26 is executed at the decode stage of the instruction which uses the register value in the latest register update allocation buffer 48-0 as a source operand. That is, whether the decode stage allocation buffer address signal E1 which is obtained at the decode stage of the instruction is matched with the R1 update buffer address 56 of the RS allocation entry 26-11 in the reservation station 26 or not is discriminated by a matching processing unit 92. If they coincide, the latest register update data in the latest register update allocation buffer 48-0 is read out and stored into the data area 58 in the RS allocation entry 26-11 in the reservation station 26. The data area 58 in the RS allocation entry 26-11 can be defined as a data reservation station 62 by dividing it to the area surrounded by the broken line including another allocation entry. Therefore, the latest register update data processing unit 22 reads out the register value in the latest register update allocation buffer 48-0 and stores it into the portion of the allocation entry in the data reservation station 62. As mentioned above, with respect to the storage control of the register data into the reservation station in FIGS. 3A to 7B, regardless of whether the operating state is the speculative execution of the instruction or is not the speculative execution at the decode stage of the data update instruction, the read-out by the allocation address of the latest register update allocation buffer and the storage of the read-out CC data into the reservation station can be realized by two stages.

Figure 8B:
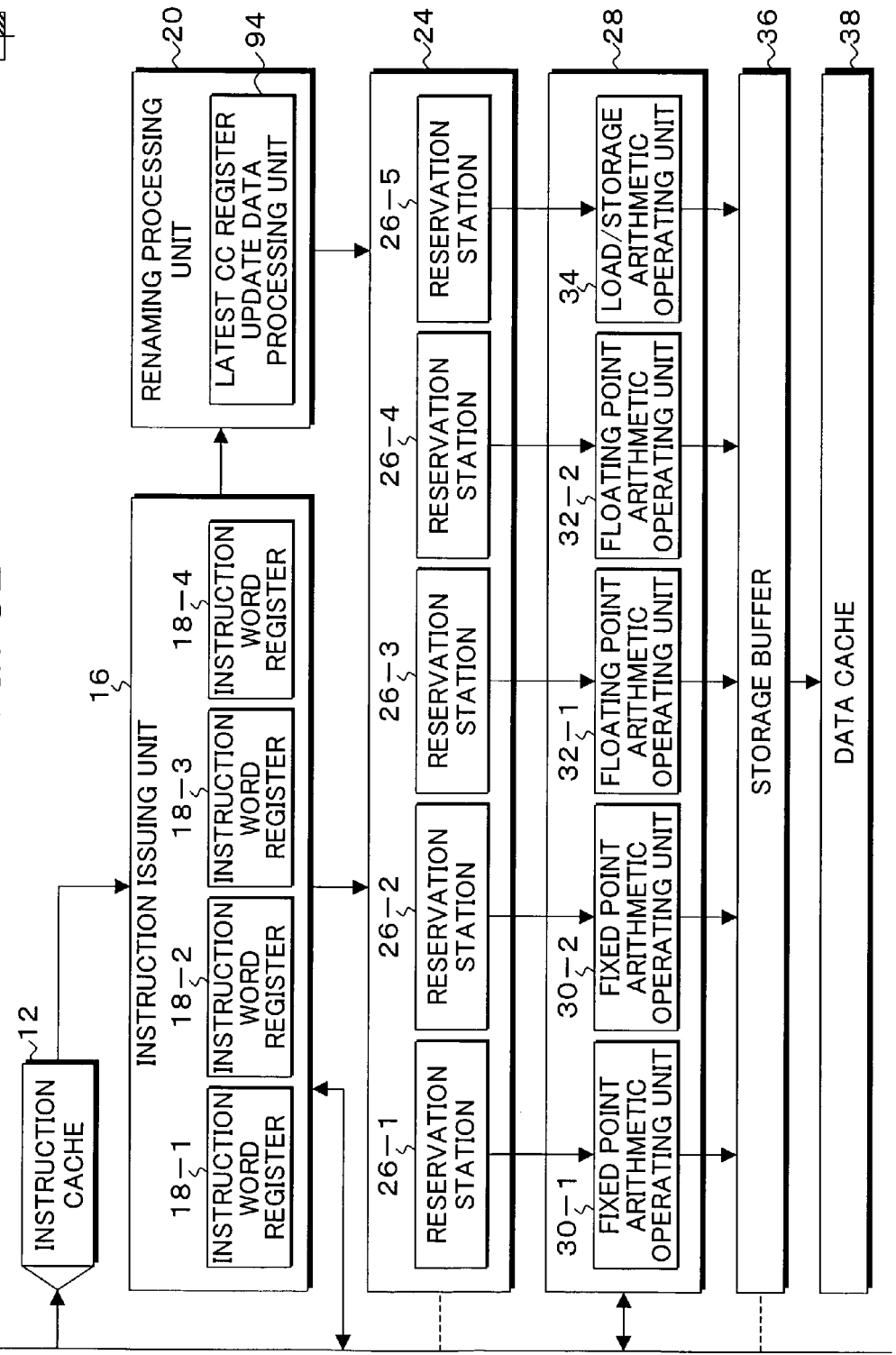

FIGS. 8A and 8B are block diagrams of the hardware construction of the processor according to the invention for making storage control of CC register data into the reservation station. Although a construction of this processor is fundamentally the same as that of the processor in FIGS. 3A and 3B, it differs from it with respect to a point that a latest CC register update data processing unit 94 is provided for the renaming processing unit 20 and a CC register update buffer 96 and a latest CC register update allocation buffer 98-0 are provided in the register file 40. Naturally, the actual apparatus has a construction such that the latest CC register update data processing unit 94 and the CC register update buffer 96 and the latest CC register update buffer 98 in the register file 40 in FIGS. 8A and 8B are added to the construction of the embodiment of FIGS. 3A and 3B.

FIG. 9 is a block diagram of a processing state where CC data is stored into the latest CC register update buffer at the update stage in the latest register update buffer at the update stage in the latest CC register update data processing unit in FIGS. 8A and 8B. Latest CC register update allocation buffer 98-0 allocated to the latest CC register update buffer 98 in FIGS. 8A and 8B in correspondence to a CC register 100 is prepared for the latest CC register update data processing unit 94. A CC pending bit latch 102-0 and a CC allocation address latch 104-0 are provided in correspondence to the latest CC register update allocation buffer 98-0. A decode stage allocation buffer address signal E11 and an update pending signal E12 are supplied to the latest CC register update data processing unit 94 at the decode stage of the instruction. An update stage allocation buffer address signal E13 which is obtained at the update stage after the register value as an execution result was obtained at the executing stage subsequent to the decode stage, an updating cycle valid signal E14, and an arithmetic operation result data signal E16 are also supplied. Further, a 1 cycle-late signal E15 of a flush for an empty space at the time when a misbranch occurs in the initial execution of the instruction is also supplied. Further, a CC register data signal E17 is supplied by the read-out from the CC register 100. At the decode stage of the instruction, for example, the RS allocation entry 26-11 is assured in the reservation station 26. The RS allocation entry 26-11 includes a CC register update buffer address 110, a CC data area 112, and an instruction operation 114 such as an OP code or the like. The first source register R1 side regarding the RS allocation entry 26-11 is shown and the second source register R2 side and the destination register side are omitted. Including another allocation entry, the CC data area 112 in the RS allocation entry 26-11 is called a CC data reservation station 116 as shown by a block surrounded by a broken line.

Figure 10:
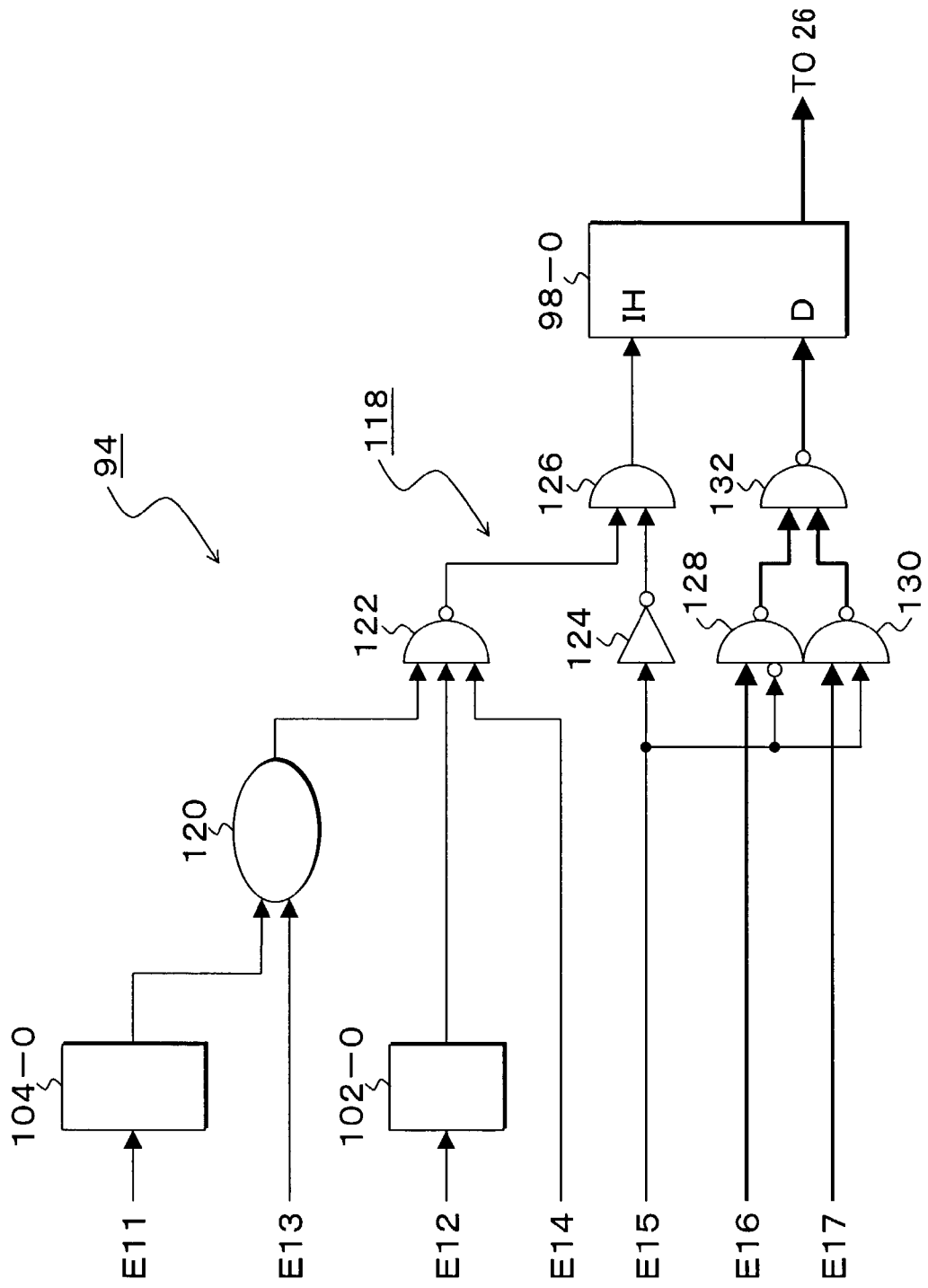
FIG. 10 is a block diagram of a functional construction in the latest CC register update data processing unit in FIG. 9.

FIG. 10 is a block diagram of a functional construction showing a specific embodiment of the latest CC register update data processing unit 94 in FIG. 9. The latest CC register update allocation buffer 98-0 is prepared for the latest CC register update data processing unit 94 in correspondence to the CC register 100 in FIG. 9. In correspondence to the latest CC register update allocation buffer 98-0, the CC allocation buffer address latch 104-0 and the CC pending bit latch 102-0 are provided. The writing of the CC data into the latest CC register update allocation buffer 98-0 is executed by a logic control unit 118. The logic control unit 118 is constructed by a matching processing unit 120, NAND gates 122, 128, 130, and 132, an inverter 124, and an AND gate 126.

The processing operation of the latest CC register update data processing unit 94 in FIG. 10 will be explained hereinbelow. An allocation entry corresponding to the CC register having the construction as shown in FIG. 9 is prepared at the decode stage of the instruction which needs the update of the CC data. Since the decode stage allocation buffer address signal E11 of the latest CC register update allocation buffer 98-0 prepared at the decode stage of the instruction is obtained, it is held in the CC allocation buffer address latch 104-0. At the same time, since the update pending signal E12 is obtained, it is held in the CC pending bit latch 102-0. If the CC register value is obtained as an execution result at the executing stage by the speculative execution subsequently to the decode stage of the instruction, the update stage allocation buffer address signal E13, the updating cycle valid signal E14, and the arithmetic operation result CC data signal E16 are obtained at the next update stage. Therefore, whether the allocation buffer address at the decode stage in the CC allocation buffer address latch 104-0 is matched with the allocation buffer address of the update stage or not is discriminated by the matching processing unit 120. When they coincide, an output to the NAND gate 122 is set to the level 1. At this time, since the CC pending bit has been held in the CC pending bit latch 102-0, the output to the NAND gate 122 is at the level 1. Further, since the updating cycle valid signal E14 is obtained, an input to the NAND gate 122 is set to the level 1. Since all inputs to the NAND gate 122 are at the level 1, its output is set to the level 0. At this time, since the 1 cycle-late signal E15 of the flush to the inverter 124 is not obtained, inputs of the AND gate 126 are set to (0, 1) and its output is set to the level 0, thereby validating the writing at the control terminal IH (Inhibit Pin) of the latest CC register update allocation buffer 98-0. At this update stage, the arithmetic operation result CC data signal E16 is obtained as an arithmetic operation result to the NAND gate 128 and the 1 cycle-late signal E15 of the flush does not exist. Therefore, the NAND gate 128 enters a permission state and the arithmetic operation result CC data signal E16 is written into the latest CC register update allocation buffer 98-0 from the data terminal D via the NAND gates 128 and 132. If the misbranch is determined by the branch prediction during the speculative execution of the instruction, the 1 cycle-late signal E15 of the flush to abandon all instructions from the branch prediction is obtained. If the 1 cycle-late signal E15 of the flush is obtained, an output of the AND gate 126 is set to the level 0 irrespective of the level of the output of the NAND gate 122, thereby validating the writing at the control terminal IH of the latest CC register update allocation buffer 98-0. At this time, the CC register data signal E17 is supplied to the NAND gate 130 set to the permission state by the 1 cycle-late signal E15 of the flush. The CC register data signal E17 is overwritten into the latest CC register update allocation buffer 98-0 from the data terminal D via the NAND gates 130 and 132.

Figure 11:
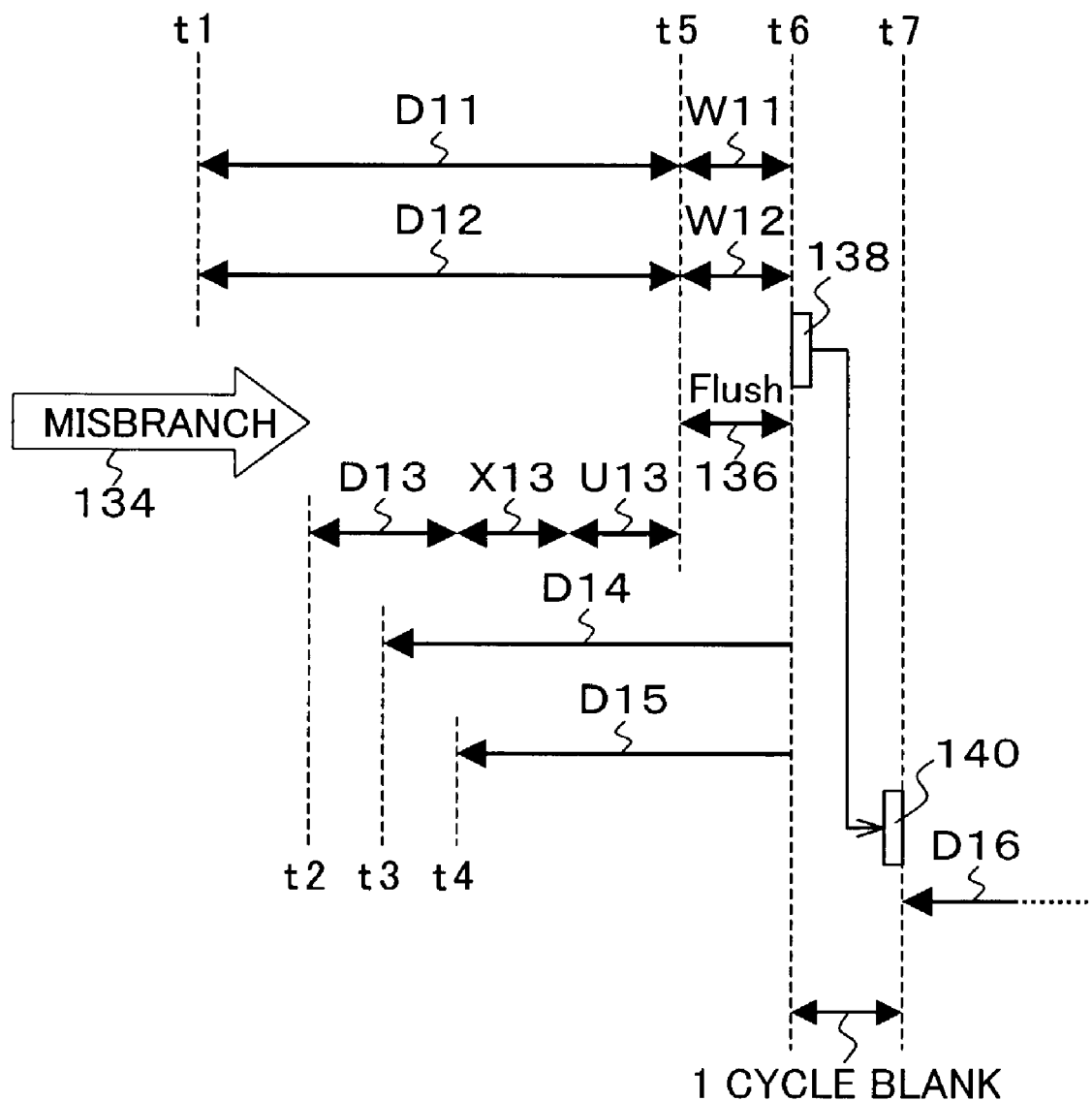
FIG. 11 is an explanatory diagram of a pipeline stage at which a CC data storing process of the invention is executed.

FIG. 11 is an explanatory diagram of a pipeline stage corresponding to the processing operation of the latest CC register update data processing unit 94 in FIG. 10. Two instructions which are not speculatively executed are simultaneously fetched from time t1 and decode stages D11 and D12 are started. Subsequently, decode stages D13, D14, and D15 for the speculative execution of instructions are sequentially started at times t2, t3, and t4 on the basis of the branch prediction. Subsequent to the decode stage D13 of the first instruction by the branch prediction, the CC register value is obtained as an execution result by the speculative execution at an executing stage X13. At a next update stage U13, by the control of the logic control unit 118 in FIG. 10, the CC register data signal E17 as an arithmetic operation result is stored into the latest CC register update allocation buffer 98-0. Subsequently, at time t5, if a failure of the branch prediction is determined, a flushing process 136 is executed during a time interval from time t5 to time t6 in order to abandon all of the instructions until a misbranch 134. In association with the flushing process 136, the 1 cycle-late signal E15 of the flush is supplied to the latest CC register update data processing unit 94 in FIG. 10. The CC register data signal E17 obtained from the CC register 100 at this time is overwritten into the latest CC register update allocation buffer 98-0 by the control operation by the logic control unit 118. Subsequently, in a blank of one cycle between time t6 and time t7 subsequent to the flushing process 136, the register value in the CC register 100 in FIG. 9 in which the CC data before the branch has been held is read out by a CC general register reading process 138 and a latest CC register update buffer storing process 140 for overwriting the read-out register value into the latest CC register update allocation buffer 98-0 is executed by the logic control unit 118 in FIG. 10. Therefore, at a decode stage D16 of the instruction from time t7 after the elapse of the blank of one cycle after the misbranch, for example, the latest CC data written at a writing stage W12 of the second instruction from time t1 before the branch which has been overwritten into the latest CC register update allocation buffer 98-0 in FIG. 10 is read out from the latest CC register update allocation buffer 98-0 and stored into the reservation station by the process associated with the flushing process 136 due to the misbranch.

Figure 12:
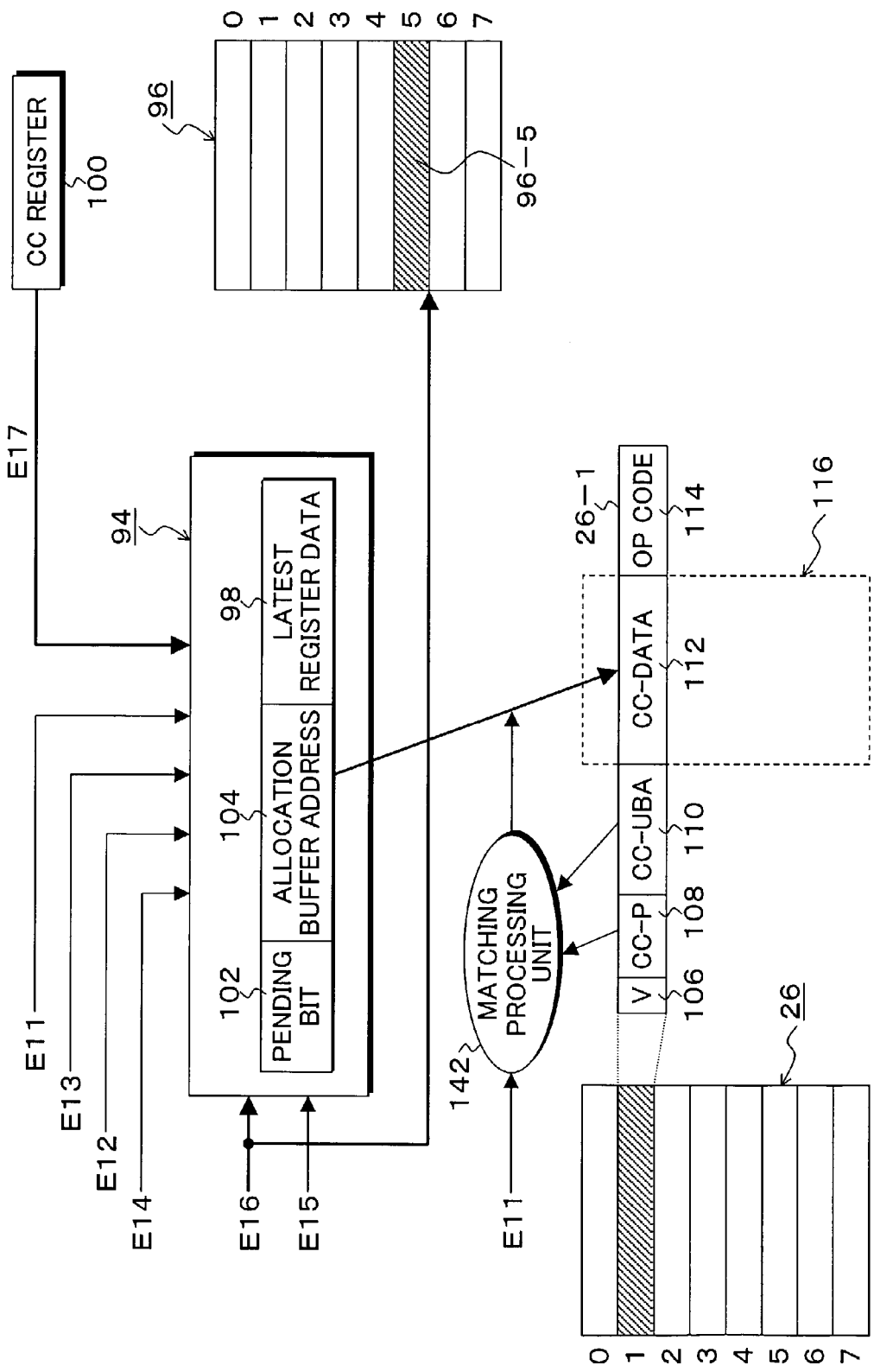
FIG. 12 is a functional block diagram of instruction control according to the invention for storing the CC data in the latest CC register update buffer in FIG. 9 into the reservation station at the decode stage.

FIG. 12 is an explanatory diagram of a storing process of the latest CC data into the reservation station at the decode stage of the instruction in the latest CC register update data processing unit 94 in FIG. 9. At the decode stage of the instruction, since the decode stage allocation buffer address signal E11 has been obtained, it is sent to a matching processing unit 142. Whether it is matched with the CC register update buffer address 110 of the RS allocation entry 26-11 in the reservation station 26 or not is discriminated. If they coincide, the latest CC register update data stored in the latest CC register update allocation buffer 98-0 is read out and stored into the CC data area 112 in the reservation station 26. As mentioned above, also with respect to the storage control of the CC data into the reservation station in FIGS. 8A to 12, irrespective of the case of the speculative execution of the instruction or the case of not the speculative execution at the decode stage of the CC data update instruction, the read-out from the latest CC register update allocation buffer 98-0 by the allocation address and the storage of the read-out CC data into the reservation station can be realized at two stages.

According to the invention as mentioned above, the latest register update buffer is allocated and prepared every general register. While the instruction to update the register is not speculatively executed, the data in the general register is stored into the latest register update buffer. When the instruction is speculatively executed, the register value obtained as a result of the speculative execution is overwritten into the latest register update buffer. When the register update instruction is decoded, regardless of whether the register update data is update-pending or not, all of the instructions are read out from the latest register update buffer and stored into the data area in the reservation station. Thus, in any case, the data can be stored into the reservation station by the process of the same clock cycle. The operating frequency of the processor can be easily raised without causing the problem of an obstacle to the high frequency circuit in the case of raising the operating frequency of the processor due to a difference of the number of processing clocks irrespective of the data storing process to the same reservation station.

The latest register update buffer is allocated and prepared every CC register. While the CC register update instruction is not speculatively executed, the data in the CC register is stored into the latest CC register update buffer. When the instruction is speculatively executed, the latest CC register update buffer is overwritten by the register value as a result of the speculative execution. When the CC register update instruction is decoded, regardless of whether the CC register update data is update-pending or not, all of the instructions are read out from the latest CC register update buffer and stored into the CC data area in the reservation station. Thus, regardless of whether the instruction is speculatively being executed, that is, the CC register update data is update-pending or not, the CC data can be stored into the reservation station by the process of the same clock cycle. The operating frequency of the processor can be easily raised without causing the problem which causes an obstacle to the high frequency circuit in the case of raising the operating frequency of the processor due to a difference of the number of clock cycles.

The invention is not limited to the foregoing embodiment but incorporates many proper modifications without losing the objects and advantages of the invention. The invention is not limited by the numerical values shown in the foregoing embodiment. Particularly, in the storage control of the CC data into the reservation station in FIGS. 8A to 11, the case where one CC register to store the condition code CC is provided has been mentioned as an example for simplicity of explanation. However, actually, a plurality of CC registers are used and a plurality of allocation entries comprising a combination of the latest CC register update allocation buffer 98-0, the CC allocation buffer address latch 104-0, and the CC pending bit latch 102-0 in the latest CC register update data processing unit 94 are provided in correspondence to the respective CC registers.

What is claimed is:

1. A processor comprising:
   a buffer which is allocated a respective storage location for all general registers storing source data and stores latest register update data;
   a buffer control unit which stores the latest register update data into said buffer in accordance with success or failure of speculative execution of a register update instruction; and
   a storage control unit which reads out the latest register update data from said buffer and stores the latest register update data into a data area in a reservation station upon decoding the register update instruction, without determining whether the latest register update data is update-pending,
   wherein the buffer control unit stores the latest register update data obtained from the speculative execution into said buffer upon success in the speculative execution of the register update instruction, and stores data in a general register into the buffer as the speculative execution of the register update instruction is cancelled upon completion of a branch prediction of a branch instruction associated with the speculative execution of the register update instruction and failure of the branch instruction is predicted by the branch prediction.

2. The processor according to claim 1, wherein said buffer control unit comprises:
   an address latch which holds an allocation address of said buffer;
   an update pending latch which holds a pending bit showing that said register update data is update-pending; and
   a logic control unit which stores the latest register update data into said buffer in an updating cycle by the speculative execution of the instruction under conditions such that an update address of the register update data coincides with the allocation address in said address latch, the pending bit is held in said update pending latch, and an updating cycle valid signal is obtained.

3. The processor according to claim 1, wherein said buffer control unit reads out the data from said general register and stores the data into said buffer in one blank cycle after the instruction which is being speculatively executed is abandoned.

4. The processor according to claim 1, wherein said buffer control unit reads out the latest register update data with reference to said buffer by a register address and stores the latest register update data into the data area in said reservation station upon instruction decoding.

5. An instruction control method of a processor which executes instructions by dynamic pipeline scheduling, comprising:
   buffer controlling wherein latest register update data is stored into a buffer which is allocated a respective storage location for all general registers storing source data in accordance with success or failure of speculative execution of a register update instruction; and
   storage controlling wherein the latest register update data is read out from said buffer and stored into a data area in a reservation station upon decoding the register update instruction, without determining whether the latest register update data is update-pending,
   wherein the latest register update data obtained from the speculative execution is stored into said buffer upon success in the speculative execution of the register update instruction, and data in a general register is stored into the buffer as the speculative execution of the register update instruction is cancelled upon completion of a branch prediction of a branch instruction associated with the speculative execution of the register update instruction and failure of the branch instruction is predicted by the branch prediction.

6. The method according to claim 5, wherein said buffer controlling comprises:
   holding an allocation address of said buffer into an address latch;
   holding a pending bit showing that said register update data is update-pending into an update pending latch; and
   storing the latest register update data into said buffer in an updating cycle by the speculative execution of the instruction under conditions such that an update address of the register update data coincides with the allocation address in said address latch, the pending bit is held in said update pending latch, and an updating cycle valid signal is obtained.

7. The method according to claim 5, wherein in said buffer controlling, the data is read out from said general register and stored into said buffer in one blank cycle after the instruction which is being speculatively executed is abandoned.

8. The method according to claim 5, wherein in said buffer controlling, the latest register update data is read out with reference to said buffer by a register address and stored into the data area in said reservation station upon instruction decoding.

9. A processor comprising:
   a buffer which is allocated a respective storage location for all registers storing a condition code and stores latest condition code register update data;
   a buffer control unit which sets the latest condition code register update data into said buffer in accordance with success or failure of speculative execution of a condition code register update instruction; and
   a storage control unit which reads out the latest condition code register update data from said buffer and stores the latest update data into a condition code data area in a reservation station upon decoding the condition code register update instruction, without determining whether the latest condition code register update data is update-pending,
   wherein the buffer control unit stores the latest register update data obtained from the speculative execution into said buffer upon success in the speculative execution of the condition code register update instruction, and stores data in a general register into the buffer as the speculative execution of the register update instruction is cancelled upon completion of a branch prediction of a branch instruction associated with the speculative execution of the condition code register update instruction and failure of the branch instruction is predicted by the branch prediction.

10. The processor according to claim 9, wherein said buffer control unit comprises:
    an address latch which holds an allocation address of said buffer;
    an update pending latch which holds a pending bit showing that said condition code register update data is update-pending; and
    a logic control unit which stores the latest condition code register update data into said buffer in an updating cycle by the speculative execution of the instruction under conditions such that an update address of the condition code register update data coincides with the allocation address in said address latch, the pending bit is held in said update pending latch, and an updating cycle valid signal is obtained.

11. The processor according to claim 9, wherein said buffer control unit reads out the data from said condition code register and stores the data into said buffer in one blank cycle after the instruction which is being speculatively executed is abandoned.

12. The processor according to claim 9, wherein said buffer control unit reads out the latest condition code register update data with reference to said buffer by the address in the condition code register and stores the update data into the condition code data area in said reservation station upon instruction decoding.

13. An instruction control method of a processor which executes instructions by dynamic pipeline scheduling, comprising:
   buffer controlling wherein latest condition code register update data is set into a buffer which is allocated a respective storage location for all registers storing a condition code in accordance with success or failure of speculative execution of a condition code register update instruction; and
   storage controlling wherein the latest condition code register update data is read out from said buffer and stored into a condition code data area in a reservation station upon decoding the condition code register update instruction, without determining whether the latest condition code register update data is update-pending,
   wherein the latest register update data obtained from the speculative execution is stored into said buffer upon success in the speculative execution of the condition code register update instruction, and data in a general register is stored into the buffer as the speculative execution of the register update instruction is cancelled upon completion of a branch prediction of a branch instruction associated with the speculative execution of the condition code register update instruction and failure of the branch instruction is predicted by the branch prediction.

14. The method according to claim 13, wherein said buffer controlling comprises:
   holding an allocation address of said buffer into an address latch;
   holding a pending bit showing that said condition code register update data is update-pending into an update pending latch; and
   storing the latest condition code register update data into said buffer in an updating cycle by the speculative execution of the instruction under conditions such that an update address of the condition code register update data coincides with the allocation address in said address latch, the pending bit is held in said update pending latch, and an updating cycle valid signal is obtained.

15. The method according to claim 13, wherein in said buffer controlling, the data is read out from said condition code register and stored into said buffer in one blank cycle after the instruction which is being speculatively executed is abandoned.

16. The method according to claim 13, wherein in said buffer controlling, the latest condition code register update data is read out with reference to said buffer by the address in the condition code register and stored into the condition code data area in said reservation station upon instruction decoding.

* * * * *